(12) United States Patent
Hirota et al.

(10) Patent No.: US 10,606,024 B2
(45) Date of Patent: Mar. 31, 2020

(54) LENS MOVING MECHANISM

(71) Applicant: THK CO., LTD., Tokyo (JP)

(72) Inventors: Jun Hirota, Tokyo (JP); Marie Shimamura, Tokyo (JP); Hajime Fukushima, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/343,839

(22) PCT Filed: Oct. 26, 2017

(86) PCT No.: PCT/JP2017/038722
§ 371 (c)(1),
(2) Date: Apr. 22, 2019

(87) PCT Pub. No.: WO2018/079660
PCT Pub. Date: May 3, 2018

(65) Prior Publication Data
US 2019/0250365 A1 Aug. 15, 2019

(30) Foreign Application Priority Data

Oct. 31, 2016 (JP) .................................. 2016-213673

(51) Int. Cl.
*G03B 21/14* (2006.01)
*G02B 7/04* (2006.01)
(Continued)

(52) U.S. Cl.
CPC ................. *G02B 7/04* (2013.01); *G02B 7/02* (2013.01); *G02B 7/023* (2013.01); *G03B 21/006* (2013.01);
(Continued)

(58) Field of Classification Search
CPC . G02B 7/04; G02B 7/02; G02B 7/023; G03B 21/142
(Continued)

(56) References Cited

U.S. PATENT DOCUMENTS

| | | |
|---|---|---|
| 6,174,102 B1 | 1/2001 | Do et al. |
| 2004/0070851 A1 | 4/2004 | Koba et al. |
| 2015/0370151 A1* | 12/2015 | Chen .................... G03B 21/142 353/101 |

FOREIGN PATENT DOCUMENTS

| | | |
|---|---|---|
| CN | 101288012 A | 10/2008 |
| DE | 10336817 A1 | 4/2004 |

(Continued)

OTHER PUBLICATIONS

Office Action dated Jun. 5, 2019, issued in counterpart TW Application No. 106136857, with English translation (6 pages).
(Continued)

*Primary Examiner* — Ryan D Howard
(74) *Attorney, Agent, or Firm* — Westerman, Hattori, Daniels & Adrian, LLP

(57) ABSTRACT

A lens moving mechanism includes a guide section which supports a lens mount unit on which a lens for projecting light is mounted and guides the lens mount unit in three orthogonal axis directions including an optical axis direction of the light, and a base member which supports a saddle guide unit of the guide section and is fixed to a projector main body. The saddle guide unit includes first linear motion guide devices which are fixed to the base member and guide the lens mount unit in an orthogonal-to-optical axis direction orthogonal to the optical axis direction.

4 Claims, 12 Drawing Sheets

(51) Int. Cl.
    *G03B 21/00*     (2006.01)
    *G02B 7/02*     (2006.01)

(52) U.S. Cl.
    CPC ........... *G03B 21/14* (2013.01); *G03B 21/142* (2013.01); *G03B 21/145* (2013.01)

(58) Field of Classification Search
    USPC ........................................................ 353/101
    See application file for complete search history.

(56) References Cited

FOREIGN PATENT DOCUMENTS

| | | |
|---|---|---|
| JP | 2000-2241 A | 1/2000 |
| JP | 2007-286121 A | 11/2007 |
| JP | 2011-123509 A | 6/2011 |
| TW | 201614302 A | 4/2016 |

OTHER PUBLICATIONS

Office Action dated Jul. 19, 2019, issued in counterpart CN application No. 201780065683.0, with English translation. (10 pages).
Notification of Reasons for Refusal dated Jun. 5, 2018, issued in counterpart Japanese Patent Application No. 2016-213673, w/English translation (4 pages).
International Search Report dated Jan. 30, 2018, issued in counterpart International Application No. PCT/JP2017/038722, w/English translation (2 pages).
Notification of Reasons for Refusal dated May 25, 2018, issued in counterpart Japanese Patent Application No. 2016-213673, w/English translation (4 pages).
Office Action dated Jan. 20, 2020, issued in counterpart DE Application No. 112017005488.5, with English tanslation. (11 pages).

\* cited by examiner

LENS MOVING MECHANISM

TECHNICAL FIELD

The present invention relates to a lens moving mechanism.

Priority is claimed on Japanese Patent Application No. 2016-213673 filed Oct. 31, 2016, the content of which is incorporated herein by reference.

BACKGROUND ART

Conventionally, a projector including an optical device that includes three light modulating devices (liquid crystal panels) which modulate each of the three colon of light R, G, and B according to image information and a color synthesizing optical device (a cross dichroic prism) to which these light modulating devices are provided and which combines the three modulated light fluxes to form image light, and a projection optical device (a projection lens) that magnifies and projects the thus formed image light, is known.

This projector includes a lens moving mechanism that moves a projected image vertically and horizontally, and performs focus adjustment or the like without moving a projector main body. Patent Literature 1 below discloses a projector including a position adjusting unit that adjusts a position in the three X, Y and Z orthogonal directions. This position adjusting unit includes a base portion which moves in the Z axis direction relative to a pedestal, a leg portion which moves in the X axis direction relative to the base portion, and a connection portion which moves in the Y axis direction relative to the leg portion (see FIG. 5 of Patent Literature 1).

CITATION LIST

Patent Literature

[Patent Literature 1] Japanese Unexamined Patent Application, First Publication No. 2007-286121

SUMMARY OF INVENTION

Technical Problem

In recent in large projectors, the weight of a lens has increased, and a lens moving mechanism has been required to have to weight and high rigidity. For this reason, for example, it is conceivable to form a frame constituting the lens moving mechanism using a lightweight aluminum cast product and to mount a highly rigid linear motion guide device configured by a track body and a moving body on the frame. However, there is a possibility that bending will occur due to the difference in rigidity between the frame and the linear emotion guide device even if a linear motion guide device of an appropriate size is selected.

The present invention provides a lens moving mechanism which can inhibit an occurrence of bending and which is lightweight and has high rigidity.

Solution to Problem

According to the first aspect of the present invention, a lens moving mechanism includes a lens mount unit on which a lens for projecting light is mounted, and a lens guide unit which supports the lens mount unit and guides the lens mount unit in triaxial orthogonal directions including an optical axis direction of the light, and a fixing member which supports the lens guide unit and is fixed to a mount object. The lens guide unit includes linear motion guide devices which are fixed to the fixing member and guide the mount unit in an orthogonal-to-optical axis direction orthogonal to the optical axis direction.

According to the second aspect of the present invention, each of the linear motion fide devices include a track body in which rolling element rolling grooves are provided along the orthogonal-to-optical axis direction, a moving body in which element load rolling grooves facing the rolling element rolling grooves are provided, a plurality of rolling elements disposed between the rolling element rolling groove and the rolling element load rolling groove, and endless circulation paths for the rolling elements each including a load rolling element rolling path in which the rolling element rolling groove and the rolling element load rolling groove thee each other. The endless circulation paths are provided in at least one pair so that the load rolling element rolling paths extend in parallel in the orthogonal-to-optical axis direction with an interval therebetween in the optical axis direction.

The linear motion guide devices may be provided in at least one pair with an interval therebetween in the optical axis direction.

The linear motion guide devices may have a Young's modulus larger than that of the fixing member.

The fixing member may have fixing holes for fixing the fixing member to the mount object at positions corresponding to the linear motion guide device.

According to the above-described aspects, an occurrence of bending can be inhibited and a lightweight and highly rigid lens moving mechanism can be obtained.

DESCRIPTION OF EMBODIMENTS

Figure 1:
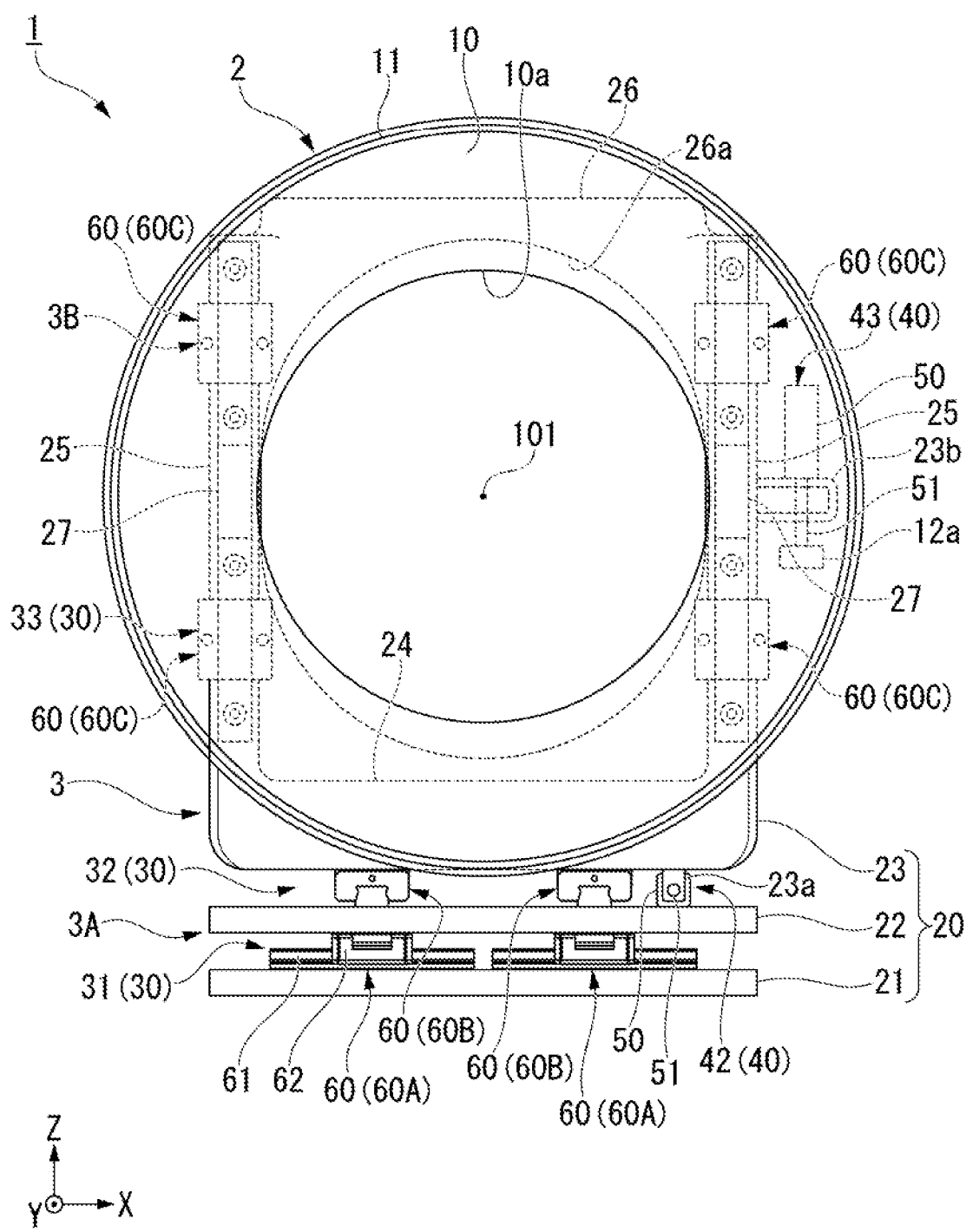
FIG. 1 is a front view showing a lens moving mechanism according to an embodiment of the present invention.

Hereinafter, embodiments of the present invention will be described with reference to the drawings. It should be understood that, in order to allow better understanding of the gist of the invention, the following embodiments are explained by way of examples and do not limit the present invention unless otherwise specified. In the drawings used for the following description, in order to make features of the present invention easy to understand, main parts may be enlarged for convenience and the dimensional ratios between respective components may not necessarily be the same as the actual ones. In addition, for the sake of easy understanding of the features of the present invention, the drawings used for the following description may have omitted parts for convenience.

Figure 2:
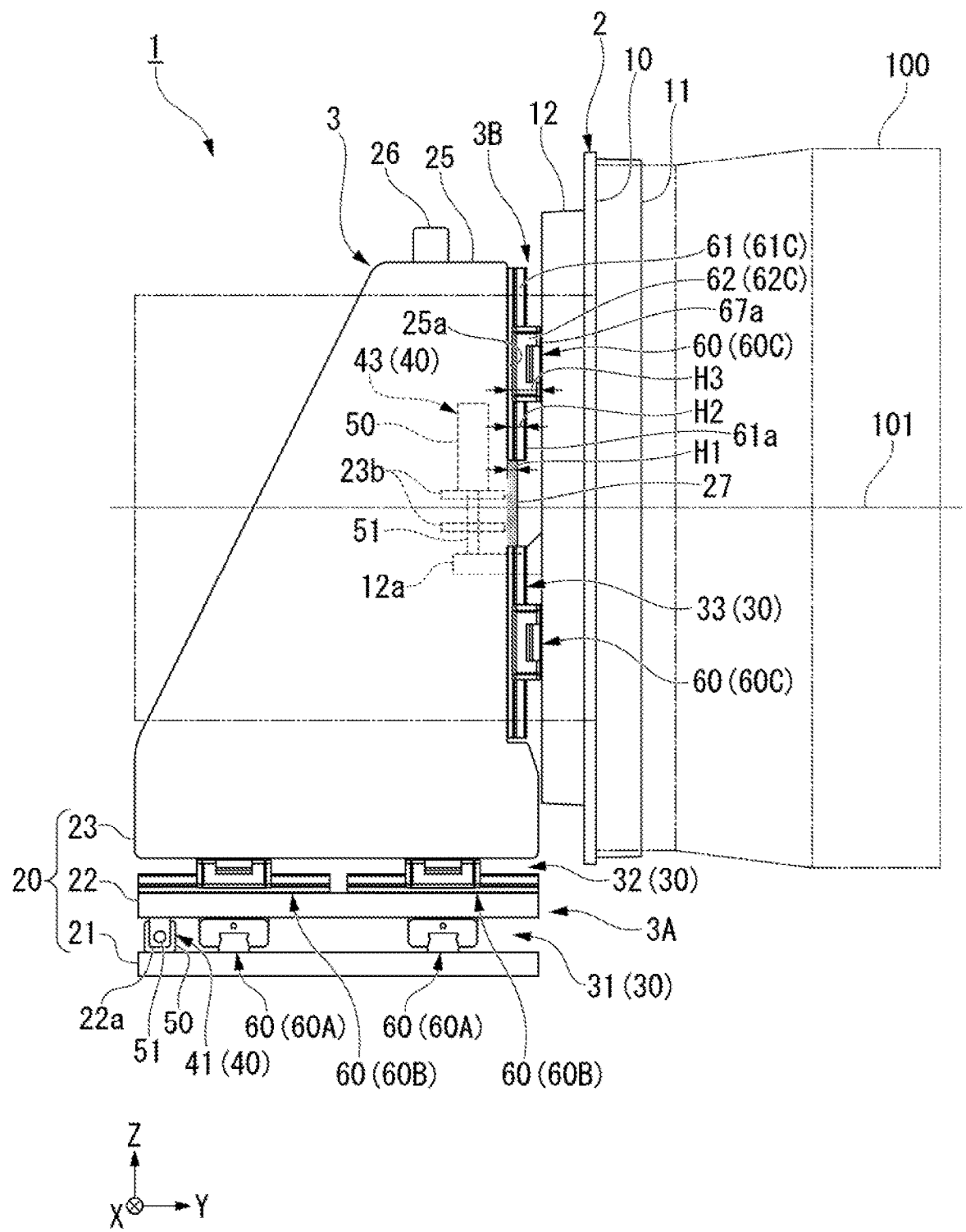
FIG. 2 is a side view showing the lens moving mechanism according to the embodiment of the present invention.

FIG. 1 is a front view showing a lens moving mechanism 1 according to an embodiment of the present invention. FIG. 2 is a side view showing the lens moving mechanism 1 according to the embodiment of the present invention.

As shown in FIG. 2, the lens moving mechanism 1 includes a lens mount 2 (a lens mounting portion) on which a lens 100 for projecting light is mounted, a lens shift unit 3 which supports the lens mount 2 and guides the lens mount 2 in three orthogonal axis directions including an optical axis direction in which an optical axis 101 of the light extends.

Also, in the following description, an XYZ orthogonal coordinate system is set, and the positional relationship between respective members may be described with reference to the XYZ orthogonal coordinate system. The Y axis direction is the optical axis direction, the X axis direction is an orthogonal-to-optical axis direction (a horizontal direction) orthogonal to the optical axis direction, and the Z axis direction is a vertical direction (one axis direction) orthogonal to the X and Y axis directions.

As shown in FIG. 1, the lens mount 2 includes a main body portion 10 formed in an annular shape, an edge portion 11 provided along an outer circumferential edge of the main body portion 10, and a back surface portion 12 provided on a back surface side of the main body portion 10, as shown in FIG. 2. As shown in FIG. 1, the main body portion 10 is a disk member having a mounting hole 10a formed in a central portion thereof. As shown in FIG. 2, the edge portion 11 is a cylindrical member provided on a front surface side of the main body portion 10 and protrudes forward from the outer circumferential edge of the main body portion 10 at a predetermined height.

As shown in FIG. 2, the lens 100 is mounted in a mounting hole 10a. The lens 100 is, for example, a lens barrel that accommodates a projection lens and the like, and is fixed to the main body portion 10 using fitting portions (not shown), bolts, or the like. The back surface portion 12 is a frame-shaped member provided on the back surface side of the main body portion 10, and is connected to a mount guide unit 33 of the lens shift unit 3. A protruding portion 12a protruding toward the back surface side of the main body portion 10 is provided on the back surface portion 12.

The protruding portion 12a is connected to a mount driving unit 41 of the lens shift unit 1.

As shown in FIG. 1, the lens shift unit 3 includes a first lens guide unit 3A which guides the lens mount 2 in two orthogonal axis directions of the X and Y axes among the three orthogonal axis directions, and a second lens guide unit 3B which guides the lens mount 2 in the Z axis direction. This lens shift unit 3 is configured by a frame section 20, a guide section 30 (a lens guide unit), and a driving section 40.

The frame section 20 includes a base member 21 (a fixing member) fixed to a mounting object, a saddle member 22 (an intermediate member) disposed above the base member 21, and a table member 23 (a support member) disposed above the saddle member 22. The frame section 20 of the present embodiment is made of a die-cast component manufactured by aluminum casting.

The guide section 30 includes a saddle guide unit 31 which guides the saddle member 22 in the orthogonal-to-optical axis direction (X axis direction) relative to the base member 21, a table guide unit 32 which guides the table member 23 in the optical axis direction (Y axis direction) relative to the saddle member 22, and a mount guide unit 33 which guides the lens mount 2 in the vertical direction (Z axis direction) relative to the table member 23. The guide section 30 of the present embodiment includes a linear motion guide device 60 made of stainless steel which is provided with a track rail 61 (a track body) and a slider block 62 (a moving body). The size of the linear motion guide device 60 in each guide unit is the same (same product).

The driving section 40 includes a saddle driving unit 41 (see FIG. 2) which moves the saddle member 22 in the orthogonal-to-optical axis direction (X axis direction) relative to the base member 21, a table driving unit 42 (see FIG. 1) which moves the table member 23 in the optical axis direction (Y axis direction) relative to the saddle member 22, and a mount driving unit 43 which moves the lens mount 2 in the vertical direction (Z axis direction) relative to the table member 23. The driving section 40 of the present embodiment includes a linear actuator in which a shaft 51 moves back and forth relative to a main body portion 50.

The base member 21 is a bottom plate member disposed at a bottom portion of the lens shift unit 3. The base member 21 supports the saddle member 22, the table member 23, the guide section 30, the driving section 40, the lens mount and the lens 100. The saddle member 22 is an intermediate member disposed between the base member 21 and the table member 23. The saddle member 22 supports the table member 23, the table guide unit 32, the table driving unit 42, the lens mount 2, the mount guide unit 33, the mount driving unit 43, and the lens 100. The table member 23 is a member connected to the lens mount 2 disposed above the lens shift unit 3. The table member 23 supports the lens mount 2, the mount guide unit 33, the mount driving unit 43, and the lens 100.

As shown in FIG. 1, the table member 23 includes a bottom portion 24 supported by the table guide unit 32, a pair of first wall portions 25 provided to stand upward from both sides in a width direction (X axis direction) of the bottom portion 24, and a second wall portion 26 disposed between the pair of first wall portions 25. The bottom portion 24 is formed in a flat plate shape along the XY plane. As shown in FIG. 2, the first wall portion 25 is formed in substantially an L-shape (substantially a right triangle shape) disposed to stand upward with respect to the XY plane. A front surface 25a of the first wall portion 25 is a vertical surface (the XZ plane) with respect to the XY plane, and the mount guide unit 33 is mounted thereon. The lens mount 2 is cantilevered on the table member 23 via the mount guide unit 33.

The second wall portion 26 is disposed behind the front surface 25a of the first wall portion 25. As shown in FIG. 1, the second wall portion 26 connects the bottom portion 24 to the pair of first will portions 25 to increase the rigidity of the table member 23. A through hole 26a is formed in a central portion of the second wall portion 26. The through hole 26a is formed in an elliptical shape larger than the punting hole 10a of the lens mount 2. The major axis of the elliptical shape of the through hole 26a is set in the vertical direction (Z axis direction), and is formed to avoid interference with the lens 100 mounted in the mounting hole 10a even when the lens mount 2 moves in the vertical direction relative to the table member 23.

As shown in FIG. 1, a support member 23b is connected to one side surface of the pair of first wall portions 25. The support member 23b supports the mount driving unit 43. The main body portion 50 of the mount driving unit 43 is fixed to the support member 23b so that the shaft 51 moves back and forth in the vertical direction (Z axis direction). A tip of the shaft 51 is fixed to the protruding portion 12a of the lens mount 2. When the shaft 51 moves back and forth relative to the main body portion 50, the lens mount 2 moves in the vertical direction relative to the table member 23.

The main body portion 50 of the table driving unit 42 is fixed to the saddle member 22. The main body portion 50 of the table driving unit 42 is fixed to an upper surface of the saddle member 22 so that the shaft 51 moves back and forth in the optical axis direction (Y axis direction). A tip of the shaft 51 is fixed to a protruding portion 23a protruding from a lower surface of the table member 23. When the shaft moves back and forth relative to the main body portion 50, the table member 23 moves in the optical axis direction relative to the saddle member 22.

As shown in FIG. 2, the main body portion 50 of the saddle driving unit 41 is fixed to the base member 21. The main body portion 50 of the saddle driving unit 41 is fixed to the base member 21 so that the shall 51 moves back and forth in the orthogonal-to-optical axis direction (X axis direction). A tip of the shaft 51 is fixed to a protruding portion 22a protruding from a lower surface of the saddle member 22. When the shaft 51 moves back and forth relative to the main body portion 50, the saddle member 22 moves in the orthogonal-to-optical axis direction relative to the base member 21.

Figure 3:
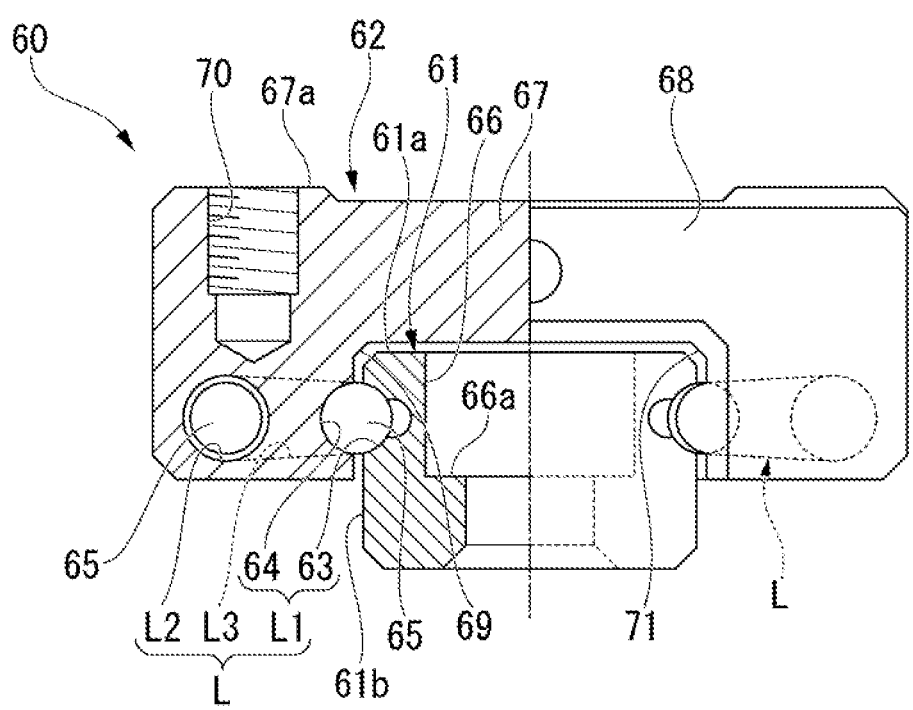
FIG. 3 is a configuration diagram showing a linear motion guide device according to the embodiment of the present invention.

FIG. 3 is a configuration diagram showing the linear motion guide device 60 according to the embodiment of the present invention.

The linear motion guide device 60 includes the track rail 61 provided with rolling element rolling grooves 63 along a longitudinal direction thereof, a slider block 62 provided with rolling element load rolling grooves 64 facing the rolling element rolling grooves 63, and a plurality of balls 65 (rolling elements) disposed between the rolling element rolling grooves 63 and the rolling element load rolling grooves 64.

The track rail 61 is an elongated member having a substantially rectangular shape in cross section. The rolling element rolling groove 63 is formed on an outer surface 61b of the track rail 61 in the width direction (the horizontal direction on the page of FIG. 3) along the longitudinal direction of the track rail 61 (the direction perpendicular to the page of FIG. 3). The rolling element rolling groove 63 is recessed in substantially an arc shape with respect to the outer surface 61b. A pair of rolling element rolling grooves 63 are formed on left and right sides of the track rail 61.

Fixing holes 66 (a track body fixing hole) to be fixed to the object (the base member 21, the saddle member 22, or the table member 23) are formed in the track rail 61. The fixing holes 66 are formed to penetrate the track rail 61 in a thickness direction thereof (the vertical direction on the page of FIG. 3). A counter bore 66a, which allows positioning of a bolt 80 (see FIG. 4, which will be described later) for fixing the track rail 61 at a position lower than an upper surface 61a of the track rail 61 shown in FIG. 3, is formed in the fixing holes 66.

The slider block 62 includes a block main body 67 and a lid body 68 attached to the block main body 67. The block main body 67 has a rail receiving groove 69 for receiving the track rail 61. The rail receiving groove 69 opens in a lower surface of the block main body 67. Fixing holes 70 (moving body fixing hole) for fixing the object (the saddle member 22, the table member 23, or the lens mount 2) are formed in a mounting surface 67a which is an upper surface of the block main body 67. The fixing holes 70 are formed at a predetermined depth in a thickness direction of the block main body 67. The fixing hole 70 is a screw hole and a bolt 81 (see FIG. 7, which will be described later) for fixing the object is screwed thereinto.

The rolling element load rolling groove 64 facing the rolling element rolling groove 63 of the track, rail 61 is formed in the rail receiving groove 69. The rolling element load rolling groove 64 is recessed in an are shape with respect to an inner surface of the rail receiving groove 69. A pair of rolling element load rolling grooves 64 are formed on left and right sides of the slider block 62 to sandwich the track rail 61 therebetween. The rolling element load rolling groove 64 faces the rolling element rolling groove 63 of the track rail 61 to form a load rolling element rolling path L1 for rolling the balls 65 in a loaded state.

No-load rolling element rolling paths L2 are formed in the block main body 67. The no-load rolling element rolling path L2 is formed to pass through the block main body 67 in the longitudinal direction. An inner diameter of the no-load rolling element rolling path L2 is larger than a ball diameter of the ball 65 and no load is applied to the ball 65. A pair of no-load rolling element rolling paths L2 are formed on left and right sides of the slider block 62 corresponding to the rolling element load rolling groove 64 the load rolling element rolling path L1).

The body 68 is attached to both end faces of the block main body 67 (see FIG. 4, which will be described later).

Like the block main body 67, the lid body 68 has a rail receiving groove 71 for receiving the track rail 61. In the lid body 68, rolling element direction change paths L3 are foamed on opposing surfaces facing both end faces of the block main body 67. Each of a pair of rolling element direction change paths L3 connects both ends of the load rolling element rolling path L1 and the no-load rolling, element rolling path L2 to form an endless circulation path L for the balls 65.

The endless circulation path L is configured by a pair of linear portions (the load rolling element rolling path L1 and the no-load rolling element rolling path L2) extending in the longitudinal direction of the track rail 61, and a pair of semicircular arcuate curved portions (the rolling element direction change paths L3) connecting end portions of the pair of linear portions. In the present embodiment, two looped endless circulation paths L are formed to extend in parallel in the longitudinal direction of the track rail 61 at intervals in the width direction of the track rail 61. Also, the linear motion guide device 60 in which a total of four endless circulation paths L, two on each of left and right sides, are formed may be used. A finite stroke type linear motion guide device in which the endless circulation path L is not formed may be used for the linear motion guide device 60. In this finite stroke type linear motion guide device, a cage (a rolling element holding member) is disposed between the rolling element rolling groove 63 and the rolling element load rolling, groove 64, and the balls 65 are rotatably held by ball holders provided in the cage.

The ball 65 intervenes between the track rail 61 and the slider block 62 to smoothly move the slider block 62 with respect to the track rail 61. The ball 65 of the present embodiment is disposed in the endless circulation path L substantially without any gap therebetween and circulates in the endless circulation path L.

Figure 4:
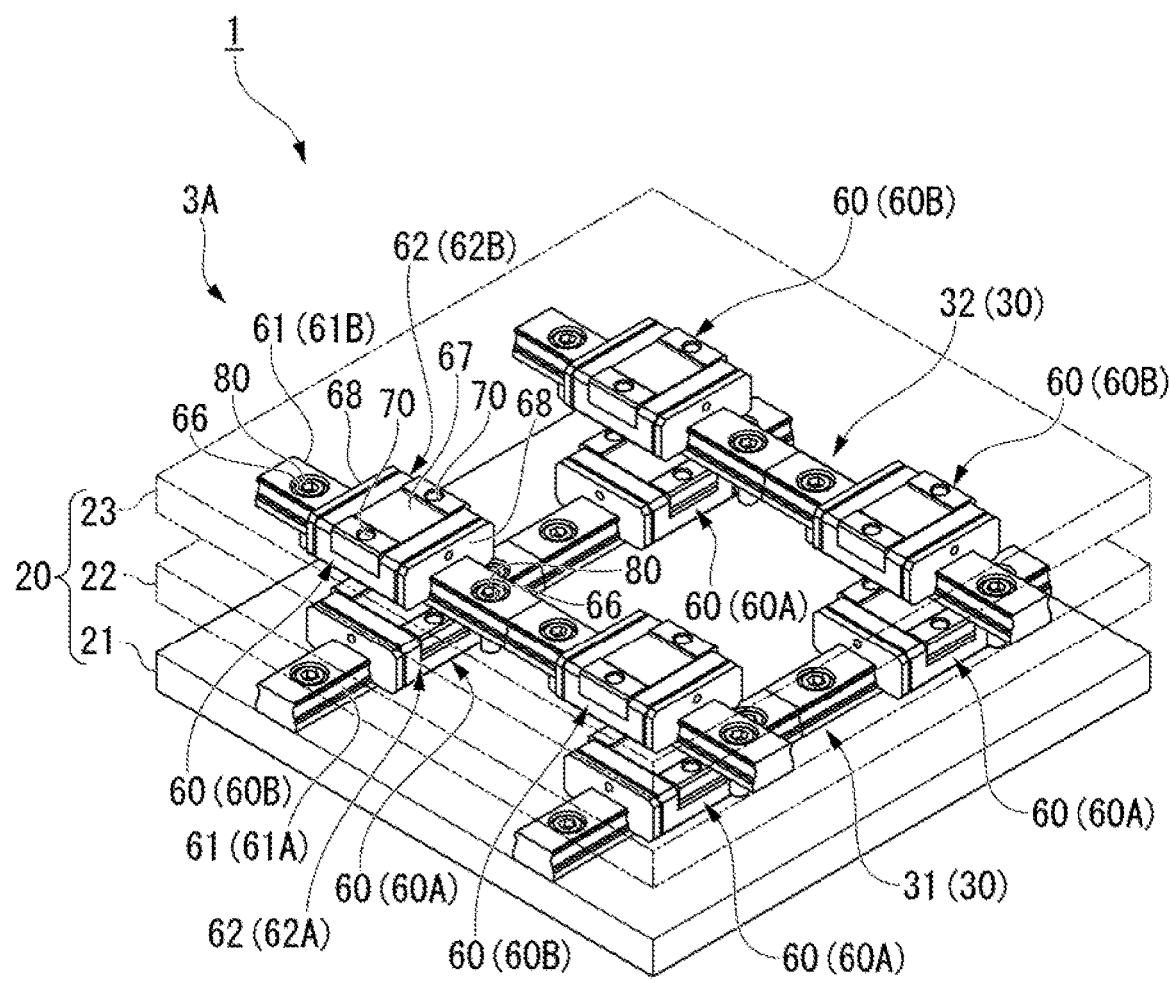
FIG. 4 is a perspective view showing an arrangement of linear motion guide devices in a first lens guide unit according to the embodiment of the present invention.

FIG. 4 is a perspective view showing an arrangement of the linear motion guide devices 60 in the first lens guide unit 3A according to the embodiment of the present invention.

As shown in FIG. 4, the first lens guide unit 3A includes a plurality of linear motion guide devices 60. The first lens guide unit 3A includes a first linear motion guide device 60A disposed in the orthogonal-to-optical axis direction (X axis direction) and a second linear motion guide device 60B disposed along the optical axis direction (Y axis direction).

The first linear motion guide device 60A includes a first track rail 61A (a first track body) fixed to the base member 21, and a first slider block 62A (a first moving body) which supports the saddle member 22 and is provided to be relatively movable along the first track rail 61A. A plurality of first linear motion guide devices 60A are provided coaxially in the orthogonal-to-optical axis direction (X axis direction), and at least a pair (four in total in this embodiment) of first linear motion guide devices 60A are provided at intervals in the optical axis direction (Y axis direction).

The second linear motion guide device 60B includes a second track rail 61B fixed to the saddle member 22, and a second slider block 62B which supports the table member 23 and is provided to be relatively movable along the second track rail 61B. A plurality of second linear motion guide devices 60B are provided coaxially in the optical axis direction (Y axis direction), and at least a pair (four in total in this embodiment) of the second linear motion guide device 60B are provided at intervals in the orthogonal-to-optical axis direction (X axis direction).

The first track rail 61A and the second track rail 61B are disposed to cross each other along the two orthogonal axis directions of the X and Y axes. A plurality of first track rails 61A fixed to the base member 21 and a plurality of second track rails 61B fixed to the saddle member 22 are disposed to form an overall shape of crossing parallel lines. Also, the track rails 61 disposed coaxially with each other may be in contact with each other or may be disposed at intervals.

Figure 5:
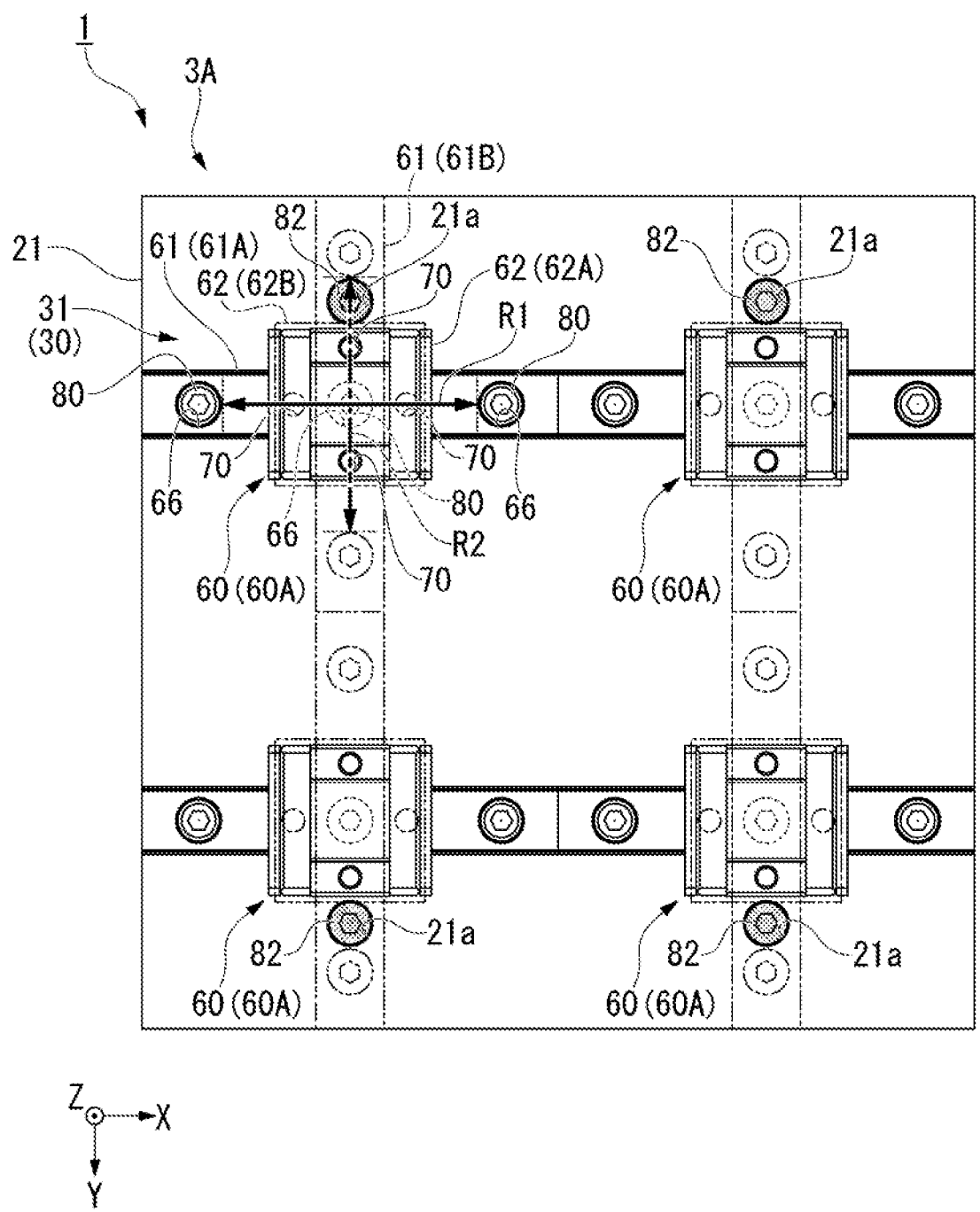
FIG. 5 is a plan view showing a base member to which a first linear motion guide device according to the embodiment of the present invention is fixed.

FIG. 5 is a plan view showing the base member 21 to which the first linear motion guide device 60A according to the embodiment of the present invention is fixed.

As shown in FIG. 5, the first track rail 61A of the first linear motion guide device 60A is fixed to the base member 21 in the orthogonal-to-optical axis direction (X axis direction). A plurality of fixing holes 66 are provided on the track rail 61 at intervals in the longitudinal direction. The fixing holes 66 of the present embodiment are formed at three positions in total in both longitudinal end portions and a central portion of the track rail 61. The bolts 80 are disposed in the fixing holes 66 of the first track rail 61A, and the first track rail 61A is fixed to the base member 21 (fixing holes 21b in FIG. 7, which will be described later) at three positions.

A plurality of fixing holes 70 are provided in the slider block 62 (the first slider block 62A) at intervals in the a direction (Y axis direction). In the present embodiment, a pair of fixing holes 70 are formed in both left and right end portions of the slider block 62 in the width direction at two positions in total. These fixing holes 70 are disposed in a central portion of the slider block 62 in the longitudinal direction (the direction orthogonal to the width direction). The bolts 81 (see FIG. 7, which will be described later) are screwed into the fixing holes 70 of the first slider block 62A, and the first slider block 62A is fixed to the saddle member 22 at two positions.

When the lens 100 is positioned at a home position, the first slider block 62A is positioned at a central portion of the first track rail 61A in the longitudinal direction, as shown in FIG. 5. Here, the home position of the lens 100 means a position at which the lens moving mechanism 1 supports the lens 100 in a steady state (an original position of the lens 100). At this time, the position of the fixing hole 70 formed in the first slider block 62A and the position of the fixing hole 66 formed in the central portion of the first track rail 61A in the longitudinal direction coincide with each other in the longitudinal direction of the first track rail 61A.

The first slider block 62A is relatively movable in a movable range R1 along the first track rail 61A. The movable range R1 of the first slider block 62A is set by a movable stroke of the saddle driving unit 41 (see FIG. 2) or a stopper (not shown). The rolling element rolling groove 63 (see FIG. 3) is formed in the first track rail 61A along the orthogonal-to-optical axis direction (X axis direction). That is, in the endless circulation path L in the first linear motion guide device 60A, a pair of load rolling element rolling paths L1 are provided to extend in parallel in the orthogonal-to-optical axis direction (X axis direction) at intervals in the optical axis direction (Y axis direction).

Figure 6:
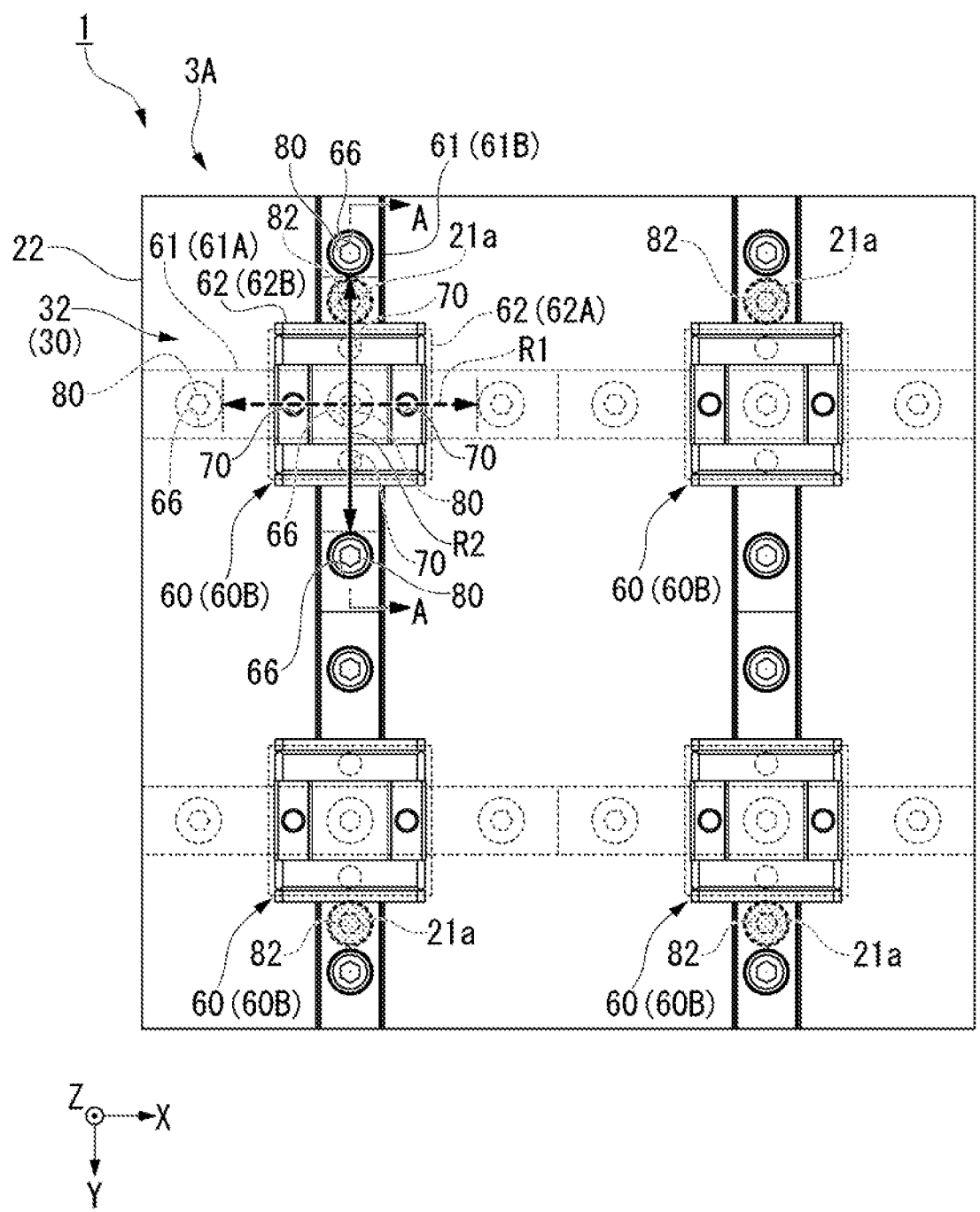
FIG. 6 is a plan view showing a saddle member to which a second linear motion guide device according to the embodiment of the present invention is fixed.

FIG. 6 is a plan view showing the saddle member 22 to which the second linear motion guide device 60B according to the embodiment of the present invention is axed.

As shown in FIG. 6, the second track rail 61B of the second linear motion guide device 60B is fixed to the saddle member 22 in the optical axis direction (Y axis direction). The bolts 80 are disposed in the fixing holes 66 of the second track rail 61B, and the second track rail 61B is fixed to the saddle member 22 at three positions. The fixing hole 66 at a central portion of the second track rail 61B in the longitudinal direction is disposed in the Z axis direction (one axis direction) to overlap the fixing hole 66 at the central portion of the first track rail 61A in the longitudinal direction.

Bolts (not shown) are screwed into the fixing holes 70 of the second slider block 62B and the second slider block 62B is fixed to the table member 23 at two positions. When the lens 100 is positioned at the borne position, the second slider block 62B is disposed at the central portion of the second track rail 61B in the longitudinal direction, as shown in FIG. 6. At this time, the position of the fixing hole 70 formed in the second slider block 62B and the position of the fixing hole 66 formed in the central portion of the second track rail 61B in the longitudinal direction coincide with each other in the longitudinal direction of the second track rail 61B.

When the lens 100 is positioned at the home position, the second slider block 62B is disposed to substantially entirely overlap the first slider block 62A in the Z axis direction (one axis direction). As shown in FIG. 6, the plurality of fixing holes 70 of the first slider block 62A are disposed alternately with the plurality of fixing holes 66 of the second track rail 61B along the second track rail 61B when viewed in the Z axis direction.

Figure 7:
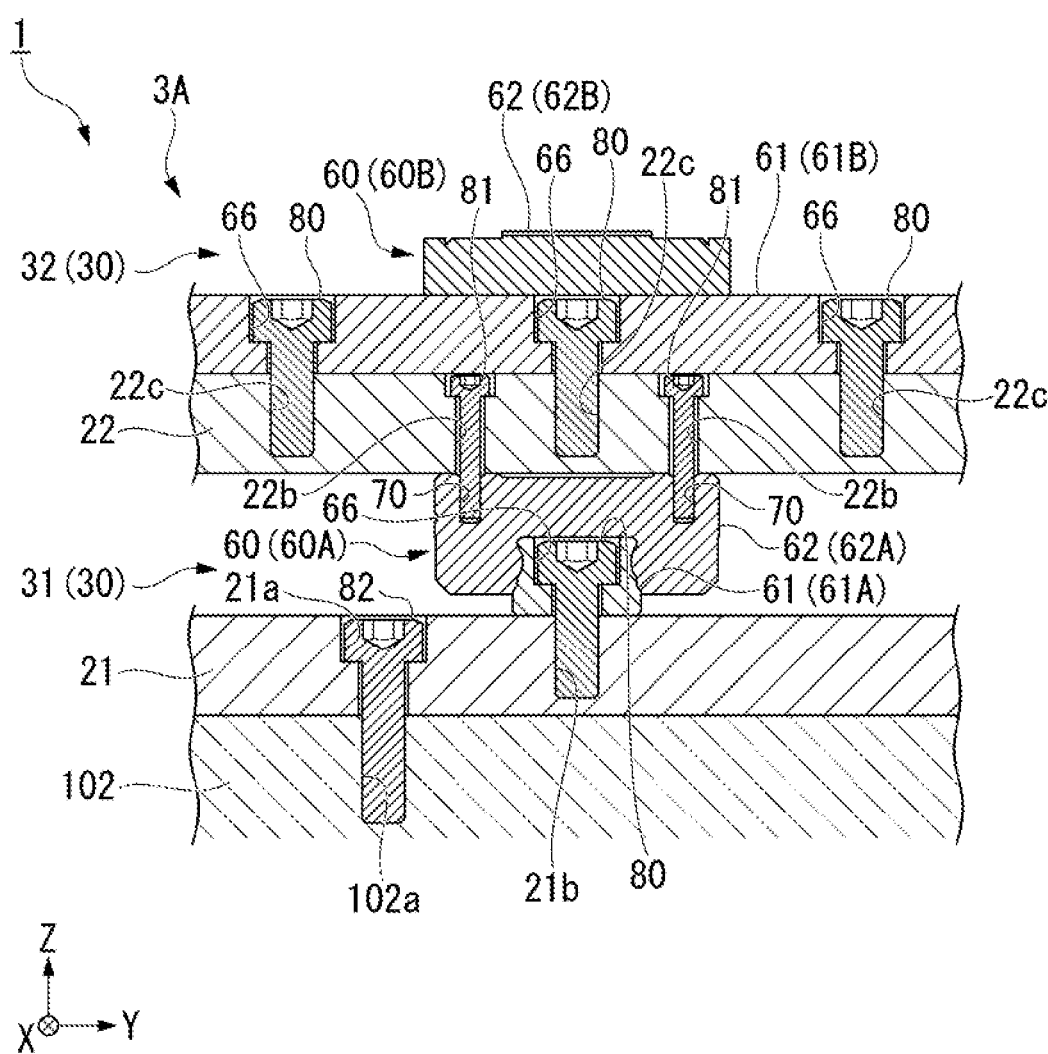
FIG. 7 is a cross-sectional view taken along a line A-A shown in FIG. 6.

FIG. 7 is a cross-sectional view taken along a line A-A shown in FIG. 6.

As shown in FIG. 7, a plurality of first fixing holes 22b for connecting the saddle member 22 and the first slider block 62A and a plurality of second fixing holes 22c for connecting the saddle member 22 and the second track rail MB are formed in the saddle member 22. The bolts 81 are inserted into the first fixing holes 22b. On the other hand, the second fixing holes 27c are screw holes and the bolts 80 are screwed thereinto. The first fixing holes 22b and the second fixing holes 22c are alternately formed at intervals in the Y axis direction. In other words, the first fixing hole 22b is disposed in spaces between the second fixing holes 22c.

In a mounting procedure, first, the saddle member 22 is fixed to the first slider blocks 62A via the bolts 81. Next, the second track rails 61B are fixed to the saddle member 22 via the bolts 80 so as to close the first fixing holes 22b which are connected with the first slider blocks 62A via the bolts 81. That is, the saddle member 22 is fixed to the first slider blocks 62A immediately below the second track rails 61B.

Returning to FIG. 6, the second slider block 62B is relatively movable within a movable range R2 along the second track rail 61B. The movable range R2 of the second slider block 62B is set by a movable stroke of the table driving unit 42 (see FIG. 1) or a stopper (not shown). The movable range R1 of the first slider block 62A and the movable range R2 of the second slider block 62B are set within a range where at least a part of the first slider block 62A and the second slider block 62B overlap in the Z axis direction.

Figure 8:
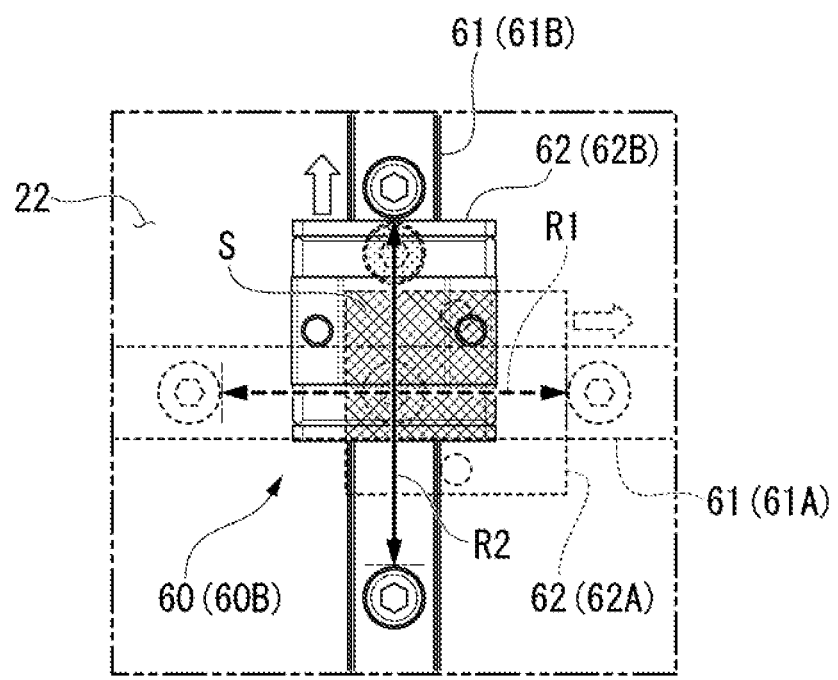
FIG. 8 is a plan view showing the relationship between a movable range of a first slider block and a movable range of a second slider block according to the embodiment of the present invention.

FIG. 8 is a plan view showing the relationship between the movable range R1 of the first slider block 62A and the movable range R2 of the second slider block 62B according to the embodiment of the present invention.

As shown in FIG. 8, when the first slider block 62A is moved to an end of the movable range R1 and the second slider block 62B is moved to an end of the movable range R2, the second slider block 62B overlaps the first slider block 62A in an area S. The area S shown in FIG. 8 is the minimum area where the first slider block 62A and the second slider block 62B overlap, and in this embodiment, at least a part of an intersecting portion of the first track rail 61A and the second track rail 61B is included.

Returning to FIG. 5, the base member 21 has fixing holes 21a for fixing the base member 21 to the mounting object (a projector main body 102 shown in FIG. 7) at a position corresponding to the first linear motion guide device 60A. Here, the position corresponding to the first linear motion guide device 60A includes the position at which the first linear motion guide device 60A is fixed and a surrounding portion thereof. The position at which the first linear motion guide device 60A is fixed is a region including immediately below the first track rail 61A and immediately below the first slider block 62A. The surrounding portion of the first linear motion guide device 60A is a region not overlapping the first track rail 61A and the first slider block 62A, and is a region having a predetermined distance from the first track rail 61A and the first slider block 62A. The range of the surrounding portion in the orthogonal-to-optical axis direction may be defined by the movable range R1 of the first slider block 62A. The range of the surrounding portion in the optical axis direction may be defined by the movable range R2 of the second slider block 62B.

As shown in FIG. 5, the fixing holes 21a of the present embodiment are disposed at the surrounding portion of the first linear motion guide devices 60A. Specifically, the fixing holes 21a are positioned in the vicinity (a side) of the first slider blocks 62A not overlapping the first slider blocks 62A, and positioned at the central portions of the first track rails 61A in the longitudinal direction. Respective fixing holes 21a formed at positions corresponding to the respective first linear motion guide devices 60A are disposed outside the pair of first linear motion guide devices 60A disposed at intervals in the optical axis direction. Bolts 82 are disposed in the fixing holes 21a, and as shown in FIG. 7, the base member 21 is fixed to the projector main body 102. Fixing holes 102a into which the bolts 82 are screwed are formed in the projector main body 102.

Figure 9:
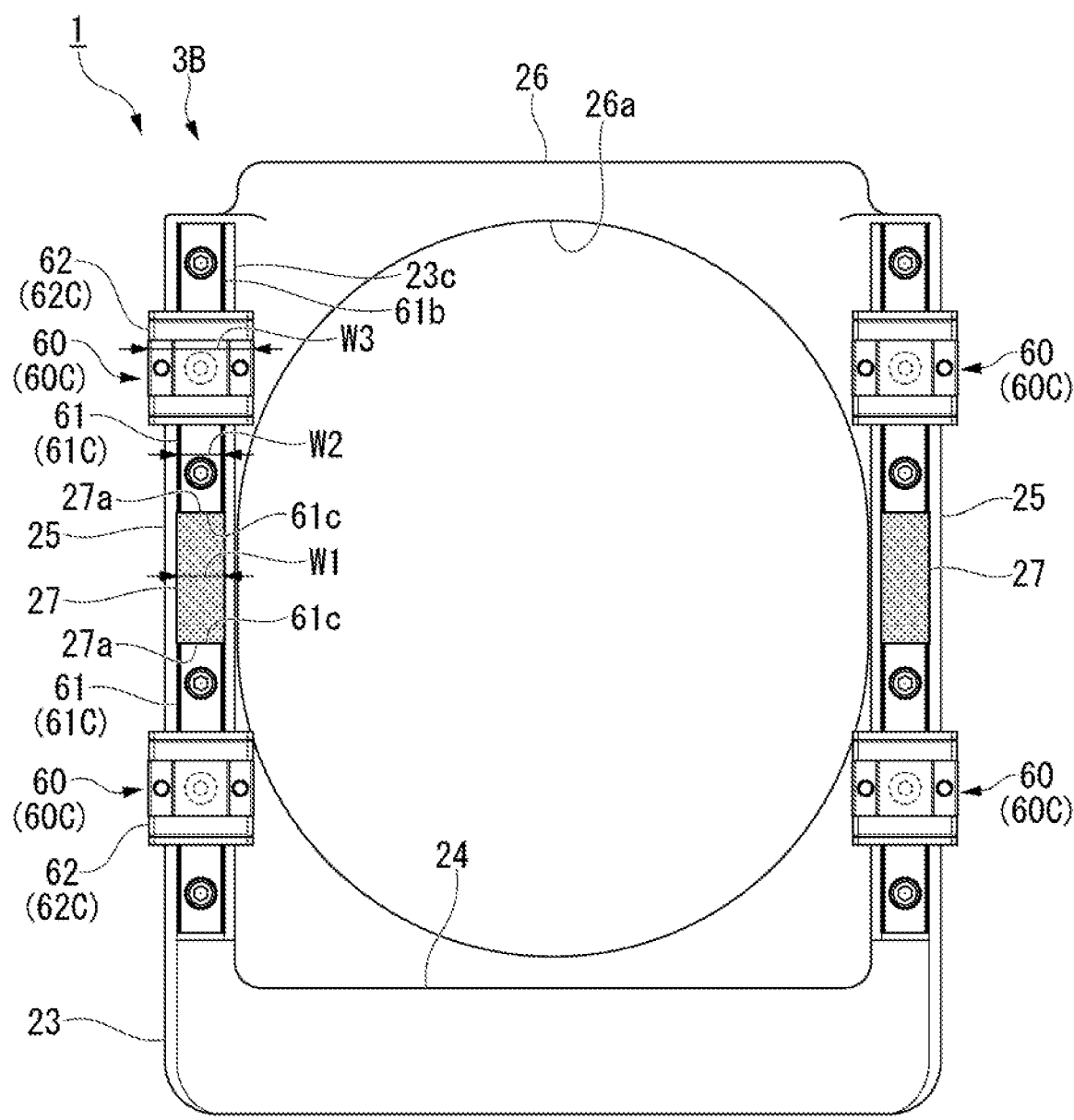
FIG. 9 is a front view showing an arrangement of the linear motion guide device in a second lens guide unit according to the embodiment of the present invention.

FIG. 9 is a front showing an arrangement of the linear motion guide device 60 in the second lens guide unit 3B according to the embodiment of the present invention.

As shown in FIG. 9, the second lens guide unit 3B includes a plurality of linear motion guide devices 60. The second lens guide unit 3B includes a plurality of third linear motion guide devices 60C disposed alone the vertical direction (Z axis direction).

A third linear motion guide device 60C includes a third track rail 61C fixed to the table member 23, and a third slider block 62C which supports the lens mount 2 and is mounted to be relatively movable along the third track rail 61C. The plurality of third linear motion guide devices 60C are provided coaxially in the vertical direction (Z axis direction), and at least a pair (a total of four in this embodiment) of third linear motion guide devices 60C are provided at intervals in the orthogonal-to-optical axis direction (X axis direction).

A plurality of third track rails 61C are coaxially disposed at intervals on the table member 23. Reinforcing portions 27 are provided between the third track rails 61C coaxially adjacent to each other. The reinforcing portion 27 has abutting surfaces 27a with which end faces 61c of the third track rails 61C coaxially adjacent to each other are brought in contact. The abutting surface 27a is formed in a planar shape parallel to the XY plane. The reinforcing portion 27 is in contact with the end faces 61c of the third track rails 61C and secures the rigidity between the coaxially adjacent third track rails 61C.

As shown in FIG. 2, the reinforcing portion 27 is integrally formed with the table member 23. That is the reinforcing portion 27 is a protruding portion manufactured integrally with the table member 23 by aluminum casting. The reinforcing portion 27 protrudes from, the front surface 25a of the first wall portion 25 to the front side. The reinforcing portion 27 is formed to have a height H1 relative to the front surface 25a. The height H1 is smaller than a height H2 from the front surface 25a to the upper surface 61a of the third track rail 61C. The height H2 is smaller than a height H3 from the front surface 25a to the mounting surface 67a of the third slider block 62C.

The reinforcing portion 27 is formed in a rectangular block shape in a front view shown in FIG. 9. A width W1 of the reinforcing portion 27 is larger than a width W2 of the third track rail 61C and smaller than a width W3 of the third slider block 62C. An outer surface 61b of the third track rail 61C is in contact with an abutting wall 23c extending in the vertical direction. The abutting wall 23c is formed at a height that does not interfere with the third slider block 62C. The third track rail 61C is positioned by two surfaces of the reinforcing portion 27 and the abutting wall 23c and is fixed to the table member 23.

Subsequently, operations of the lens moving mechanism 1 configured as described above will be described.

The lens moving mechanism 1 supports the lens 100 on the lens mount 2 as shown in FIG. 2. The lens shift unit 3 supports the lens mount 2 in a cantilever manner and receives the load of the lens 100 via the lens mount 2. As a result, a moment is generated around the bottom portion (base member 21) of the lens shift unit 3 so that the lens shift unit 3 tends to rotate (tilt) toward the front side. That is, a pull-out load that tends to pull out the bolts 82 (see FIG. 7) for fixing the base member 21 to the projector main body 102 acts thereon.

The lens 100 for large projectors is heavy and the frame section 20 of the lens shift unit 3 is easily bent. When the base member 21, the saddle member 22 and the table member 23 are made of die-cast components made by aluminum casting as in the present embodiment for the purpose of weight reduction, this bending becomes larger. For this reason, in the present embodiment, the linear motion guide device 60 (the track rail 61, the block main body 67, and the balls 65) made of stainless steel having a larger Young's modulus than those of the base member 21, the saddle member 22 and the table member 23 is adopted to enhance the rigidity of the lens shift unit 3.

However, in the lens moving mechanism 1, most of the load of the lens 100 is received by the linear motion guide device 60. Even though the linear motion guide device 60 is highly rigid, if the first linear motion guide device 60A mounted on the base member 21 is disposed in the optical axis direction (Y axis direction), the first linear motion guide device 60A receives a tilting load of the lens shift unit 3 in a pitching direction (Ma direction: around a horizontal axis orthogonal to the longitudinal direction of the first track rail 61A). For this reason, such a configuration is disadvantageous to the tilting and impact. That is, in that configuration, since a large load of pulling or pressing is locally applied to the balls 65 disposed at the both ends of the load rolling element rolling path L1 in the longitudinal direction, an indentation or the like may be formed on the first track rail 61A.

Therefore, in the present embodiment, the first linear motion guide device 60A fixed to the base member 21 is disposed in the orthogonal-to-optical axis direction (X axis direction). That is, the first linear guide device 60A includes a first track rail 61A in which the rolling element rolling grooves 63 are provided along the orthogonal-to-optical axis direction, a first slider block 62A in which the rolling element load rolling grooves 64 respectively facing the rolling element rolling grooves 63 are provided, and the plurality of balls 65 disposed between the rolling element rolling groove 63 and the rolling element load rolling groove 64.

According to this configuration, it is possible to receive the tilting load of the lens shift unit 3 in a rolling direction (Mc direction: around an axis extending in the longitudinal direction of the first track rail 61A) of the first linear guide device 60A.

As shown in FIG. 3, the balls 65 are aligned in a row in the rolling direction of the first linear motion guide device 60A, and the distances of the balls 65 to a moment fulcrum of the tilting load of the lens shift unit 3 become equal. In this way, a load is applied to the balls 65 substantially uniformly and the tilting load of the lens shift unit 3 is dispersed to the balls 65, so that an indentation is not formed on the first track rail 61A. Thus, according to the present embodiment, since high rigidity can be realized by disposing the first linear guide device 60A in the orthogonal-to-optical axis direction, it is possible to prevent the bending of the base member 21 and to endure the tilting and impact.

In the present embodiment, as shown in FIGS. 3 and 5, the first linear guide device 60A includes the endless circulation paths L for the balls 65 each of which includes the load rolling element rolling path L1 in which the rolling element rolling groove 63 and the rolling element load rolling groove 64 face each other. The endless circulation paths L are provided in at least one pair so that the load rolling element rolling paths L1 extend in parallel in the orthogonal-to-optical axis direction with an interval therebetween in the optical axis direction. According to this configuration, a pulling load can be received by the balls 65 disposed in the load rolling element rolling path L1 disposed on one side in the optical axis direction (for example, the left side in the page of FIG. 3), and a pressing (compressing) load can be received by the balls 65 disposed on the other side in the optical axis direction (for example, the right side in the page of FIG. 3).

As shown in FIG. 5, by providing the first linear motion guide devices 60A configured as described above in at least one pair with an interval therebetween in the optical axis direction, the supporting stability and rigidity of the lens shift unit 3 are further enhanced so that the tilting of the lens shift unit 3 becomes smaller.

In the present embodiment, as shown in FIG. 5, the base member 21 has the fixing holes 21a for fixing the base member 21 to the projector main body 102 at positions corresponding to the first linear guide device 60A. According to this configuration, since the base member 21 is fixed to the projector main body 102 in the vicinity of the first linear guide device 60A which receives the load of the lens 100, the bending of the base member 21 is suppressed. As in this embodiment, by disposing the fixing holes 21a in the vicinity of the first slider block 62A which receives a load, the bending of the base member 21 can be further reduced.

As described above, the aforementioned lens moving mechanism 1 of the present embodiment includes the lens mount 2 on which the lens 100 for projecting light is mounted, the first lens guide unit 3A which supports the lens mount 2 and a guide section 30 which guides the lens mount 2 in the triaxial orthogonal directions including the optical axis direction of the light, and the base member 21 which supports the saddle guide unit 31 of the guide section 30 and is fixed to the projector main body 102. The saddle guide unit 31 includes the first linear motion guiding device 60A which is fixed to the base member 21 and guides the lens mount 2 in the orthogonal-to-optical axis direction orthogonal to the optical axis direction of the light. By adopting this configuration, occurrence of the bending can be suppressed and a lightweight and highly rigid lens moving mechanism 1 can be obtained.

As described above, although a suitable embodiment of the present invention has been described with reference to the drawings, the present invention is not limited to the above-mentioned embodiment. It should be understood that the shapes, combinations, and the like of the constituent members shown in the above-described embodiment are merely examples, and various changes can be made based on design requirements and the like without departing from the spirit of the present invention.

For example, the embodiment of the present invention may employ modified examples shown in FIGS. 10 to 12 below. In the following description, the same or equivalent components as or to those of the embodiment described above are designated by the same reference numerals, and the description thereof will be simplified or omitted.

Figure 10:
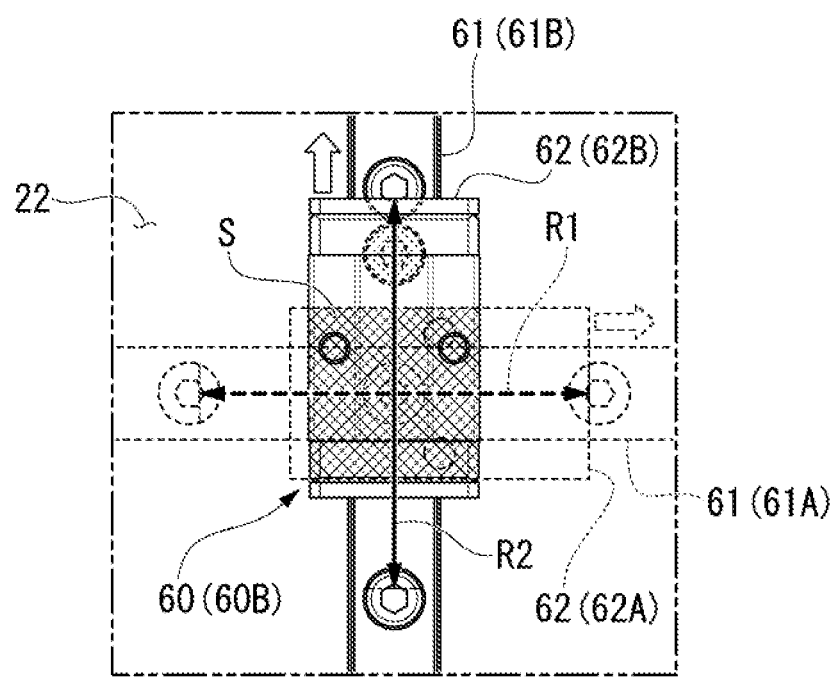
FIG. 10 is a plan view showing the relationship between a movable range of a first slider block and a movable range of a second slider block according to a modified example of the embodiment of the present invention.

FIG. 10 is a plan view showing the relationship between the movable range R1 of the first slider block 62A and the movable range R2 of the second slider block 62B according to a modified example of the embodiment of the present invention.

The first slider block 62A shown in FIG. 10 has a rectangular shape elongated in the longitudinal direction of the first track rail 61A. The second slider block 62B has a rectangular shape elongated in the longitudinal direction of the second track rail 61B. In addition, the first slider block 62A and the second slider block 62B are relatively movable within a range in which the overlapping area S in the Z axis direction (one axis direction) does not change. According to this configuration, when the linear motion guide device 60 constituting the tint lens guide unit 3A is viewed in the Z axis direction, the first slider block 62A and the second slider block 62B are disposed to overlap each other always in the same area S at any position in the movable range R1 and the movable range R2. For this reason, there is no change in the bending of the frame section 20 between the first slider block 62A and the second slider block 62B, and it is also possible to inhibit a change in the bending of the linear motion guide device 60.

Figure 11:
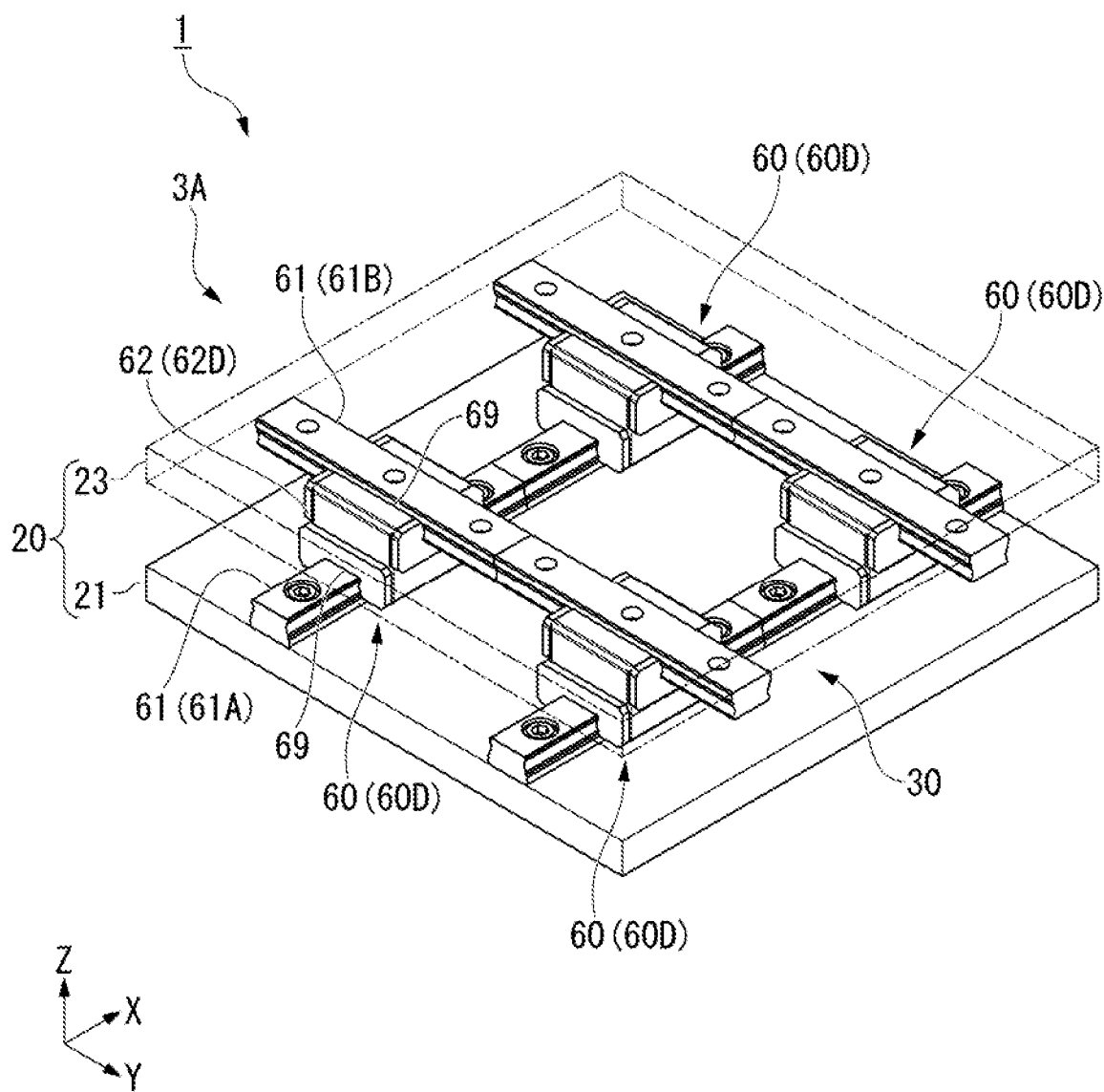
FIG. 11 is a perspective view showing an arrangement of a linear motion guide device in a first lens guide unit according to a modified example of the embodiment of the present invention.

FIG. 11 is a perspective view showing an arrangement of the linear motion guide device 60 in the first lens guide unit 3A according to a modified example of the embodiment of the present invention.

A linear motion guide device 60D shown in FIG. 11 includes a slider block 62D mounted to be relatively movable on both of the first track rail 61A and the second track rail 61B. The slider block 62D has a configuration in which the first slider block 62A and the second slider block 62B described above are combined, and includes rail accommodation grooves 69 at the top and bottom. According to this configuration, the slider block 62D is always disposed at the intersecting portion of the first track rail 61A and the second track rail 61B in the Z axis direction. Also, there is an advantage that the saddle member 22 is not required.

On the other hand, as shown in FIG. 4, the first lens guide unit 3A of the above-described embodiment includes the table member 23 supporting the lens mount 2, the saddle member 22 to which the second track rail 61B is fixed and which supports the table member 23 via the second slider block 62B, and the base member 21 to which the first track rail 61A is fixed and which supports the saddle member 22 via the first slider block 62A and is fixed to the projector main body 102. According to this configuration, the lens mount 2 can be guided in the two orthogonal axis directions without using the linear motion guide device 60D having a complicated configuration shown in FIG. 11. Also, in this configuration, although the number of installed linear motion guide devices 60 is increased, the configuration is simple, which is advantageous in cost, accordingly.

Figure 12:
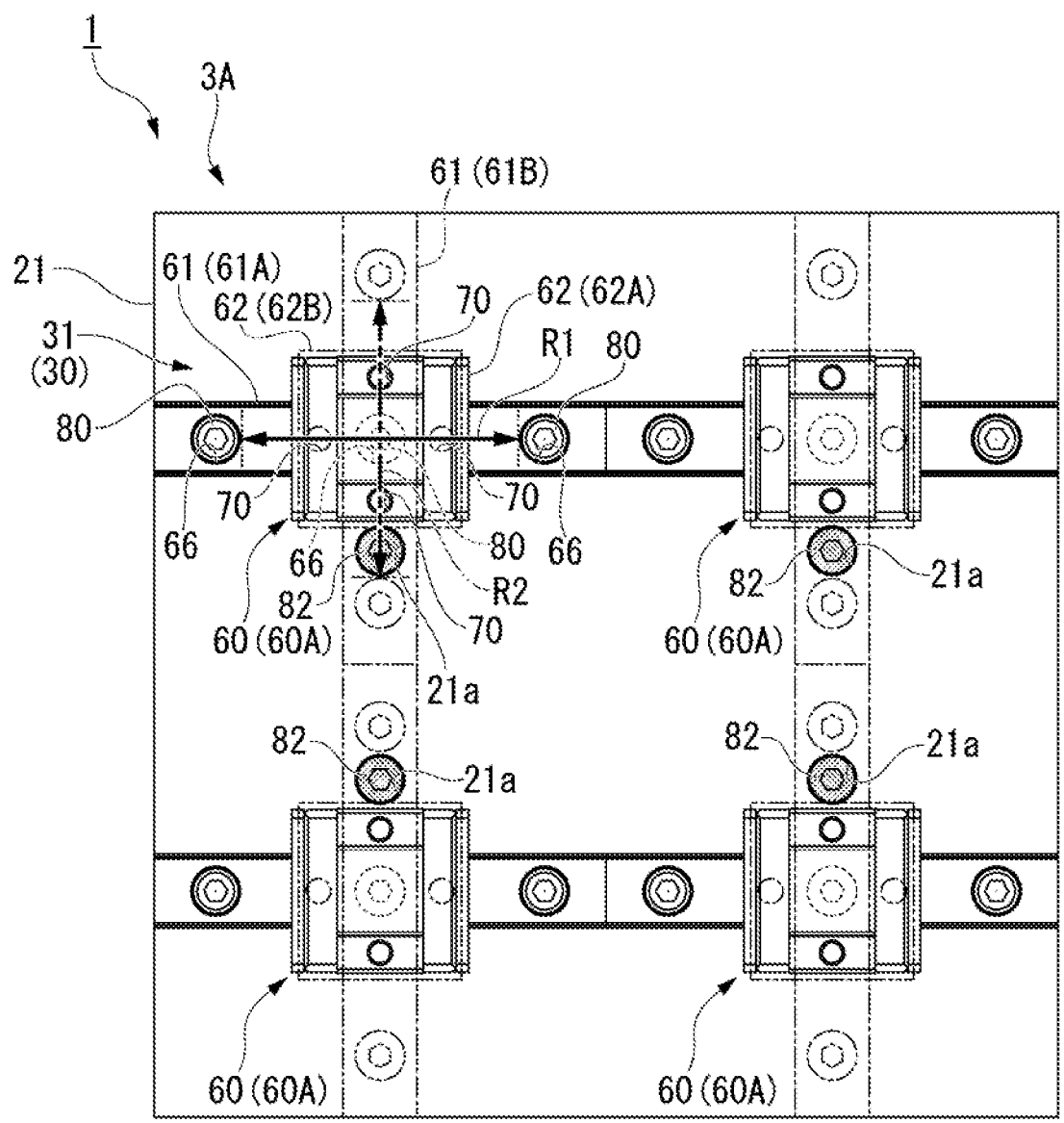
FIG. 12 is a plan view showing a base member according to a modified example of the embodiment of the present invention.

FIG. 12 is a plan view showing a base member 21 according to a modified example of the embodiment of the present invention.

The fixing holes 21a of the base member 21 shown in FIG. 12 are disposed inside of the pair of first linear motion guide devices 60A disposed at intervals in the optical axis direction. According to this configuration, the distance between the fixing holes 21a is smaller (closer) than the distance between the fixing holes 21a shown in FIG. 5 and thus the bending of the base member 21 becomes smaller. For example, when the lens moving mechanism 1 is suspended from a ceiling, by reducing the distance between the fixing holes 21a, the bending of the base member 21 between the fixing holes 21a becomes smaller.

In the above embodiment, the fixing, holes 21a of the base member 21 has been disposed in the vicinity of the first slider block 62A. However, the fixing holes 21a of the base member 21 may be dispose, for example, immediately below the first track rail 61A or the first slider block 62A and be bolted from the back side of the base member 21. The fixing holes 21a may be disposed immediately below the fixing holes 66 of the first track rail 61A, and both of the first track rail 61A and the base member 21 may be fixed to the projector main body 102 by the bolts 80.

In the above embodiment, although balls are used as rolling elements, other rolling elements such as rollers may be used, for example.

INDUSTRIAL APPLICABILITY

The occurrence of bending can be inhibited, and a light-weight and highly rigid lens moving mechanism can be obtained.

REFERENCE SIGNS LIST

1 Lens moving mechanism
2 Lens mount (lens mount unit)
21 Base member (fixing member)
30 Guide section (lens guide unit)
31 Saddle guide unit
60A First linear motion guide device (linear motion guide device)
61A First track rail (track body)
62A First slider block (moving body)
63 Rolling element rolling groove
64 Rolling element load rolling groove
65 Ball
100 Lens
101 Optical axis
102 Projector main body (mount object)
L Endless circulation path
L1 Load rolling element rolling path
L2 No-load rolling element rolling path
L3 Rolling element direction change path

The invention claimed is:

1. A lens moving mechanism comprising:
a lens mount unit on which a lens for projecting, light is mounted;
a lens guide unit which supports the lens mount unit and guides the lens mount unit in three orthogonal axis directions including an optical axis direction of the light; and
a fixing member which supports the lens guide unit and is fixed to a mount object,
wherein the lens guide unit includes linear motion guide devices which are fixed to the fixing member and guide the lens mount unit in an orthogonal-to-optical axis direction orthogonal to the optical axis direction,
wherein the orthogonal-to-optical axis direction is a direction in which a rotation axis of a moment extends, wherein the moment is generated by tilting of the lens mount unit in the optical axis direction, and
wherein each of the linear motion guide device includes:
a track body fixed to the fixing member along the orthogonal-to-optical axis direction; and
a moving body which is attached to the track body relatively movable via rolling elements, the moving body that forms rolling element load rolling grooves on both sides of the track body in the optical axis direction.

2. The lens moving mechanism according to claim 1, wherein the linear motion guide devices are provided in at least one pair with an interval therebetween in the optical axis direction.

3. The lens moving mechanism according to claim 1, wherein the linear motion guide devices have a Young's modulus larger than that of the fixing member.

4. The lens moving mechanism according to claim 1, wherein the fixing member has fixing holes for fixing the fixing member to the mount object at positions corresponding to the linear motion guide device.

* * * * *